United States Patent
Cooper (10) Patent No.: US 6,723,276 B1
(45) Date of Patent: Apr. 20, 2004

(54) SCRAP MELTER AND IMPELLER

(76) Inventor: Paul V. Cooper, 11247 Lake Forest Dr., Chesterland, OH (US) 44026

( * ) Notice: Subject to any disclaimer, the term of this patent is extended or adjusted under 35 U.S.C. 154(b) by 0 days.

(21) Appl. No.: 09/649,190

(22) Filed: Aug. 28, 2000

(51) Int. Cl.[7] ................................................. C21C 7/00
(52) U.S. Cl. ...................................... 266/235; 266/233
(58) Field of Search ................................ 266/235, 253, 266/44

(56) References Cited

U.S. PATENT DOCUMENTS

| | | |
|---|---|---|
| 209,219 A | 10/1878 | Bookwalter |
| 251,104 A | 12/1881 | Finch |
| 364,804 A | 6/1887 | Cole |
| 506,572 A | 10/1893 | Wagener |
| 585,188 A | 6/1897 | Davis |
| 898,499 A | 9/1908 | O'Donnell |
| 1,100,475 A | 6/1914 | Franckaerts |
| 1,331,997 A | 2/1920 | Neal |
| 1,454,967 A | 5/1923 | Gill |
| 1,518,501 A | 12/1924 | Gill |
| 1,522,765 A | 1/1925 | Wilke |
| 1,526,851 A | 2/1925 | Hall |
| 1,669,668 A | 5/1928 | Marshall |
| 1,673,594 A | 6/1928 | Schmidt |
| 1,717,969 A | 6/1929 | Goodner |
| 1,896,201 A | 2/1933 | Sterner-Rainer |
| 2,038,221 A | 4/1936 | Kagi |
| 2,280,979 A | 4/1942 | Rocke |
| 2,290,961 A | 7/1942 | Heuer |
| 2,488,447 A | 11/1949 | Tangen et al. |
| 2,515,478 A | 7/1950 | Tooley et al. |
| 2,566,892 A | 9/1951 | Jacobs |
| 2,677,609 A | 5/1954 | Moore et al. |
| 2,698,583 A | 1/1955 | House et al. |
| 2,787,873 A | 4/1957 | Hadley |
| 2,808,782 A | 10/1957 | Thompson et al. |
| 2,821,472 A | 1/1958 | Peterson et al. |
| 2,832,292 A | 4/1958 | Edwards |
| 2,865,618 A | 12/1958 | Abell |
| 2,901,677 A | 8/1959 | Chessman et al. |

(List continued on next page.)

FOREIGN PATENT DOCUMENTS

| | | |
|---|---|---|
| CA | 683469 | 3/1964 |
| CH | 392268 | 9/1965 |
| DE | 1800446 | 12/1969 |
| EP | 0665378 | 8/1995 |
| GB | 942648 | 11/1963 |
| GB | 1185314 | 3/1970 |
| GB | 2217784 | 11/1989 |
| JP | 58-48796 | 3/1983 |
| JP | 63-104773 | 5/1998 |
| NO | 90756 | 1/1958 |
| SU | 416401 | 6/1974 |
| SU | 773312 | 10/1980 |
| WO | 9825031 | 6/1998 |

OTHER PUBLICATIONS

Communication relating to the results of the Partial International search report for PCT/US97/22440 dated May 13, 1998.

Primary Examiner—Scott Kastler
(74) Attorney, Agent, or Firm—David E. Rogers; Squire, Sanders & Dempsey L.L.P.

(57) ABSTRACT

A device for submerging scrap metal includes: (a) a drive source, (b) a drive shaft having a first end and a second end, the first end being connected to the drive source, and (d) an impeller connected to the second end of the drive shaft, the impeller preferably having two or more outwardly-extending blades. Preferably, each of the blades has a portion that directs molten metal at least partially downward. The impeller design leads to lower operating speeds, lower vibration, longer component life and less maintenance. Additionally, the impeller preferably has a connective portion. The connective portion is used to connect the impeller to the shaft and preferably comprises a nonthreaded, tapered bore extending through the impeller.

18 Claims, 6 Drawing Sheets

U.S. PATENT DOCUMENTS

| | | |
|---|---|---|
| 2,948,524 A | 8/1960 | Sweeney et al. |
| 2,978,885 A | 4/1961 | Davison |
| 2,984,524 A | 5/1961 | Franzen |
| 2,987,885 A | 6/1961 | Hodge |
| 3,010,402 A | 11/1961 | King |
| 3,048,384 A | 8/1962 | Sweeney et al. |
| 3,070,393 A | 12/1962 | Silverberg et al. |
| 3,092,030 A | 6/1963 | Wunder |
| 3,227,547 A | 1/1966 | Szekely |
| 3,251,676 A | 5/1966 | Johnson |
| 3,255,702 A | 6/1966 | Gehrm |
| 3,272,619 A | 9/1966 | Sweeney et al. |
| 3,289,473 A | 12/1966 | Louda |
| 3,291,473 A | 12/1966 | Sweeney et al. |
| 3,400,923 A | 9/1968 | Howie et al. |
| 3,459,133 A | 8/1969 | Scheffler |
| 3,459,346 A | 8/1969 | Tinnes |
| 3,487,805 A | 1/1970 | Satterthwaite |
| 3,512,762 A | 5/1970 | Umbricht |
| 3,512,788 A | 5/1970 | Kilbane |
| 3,575,525 A | 4/1971 | Fox et al. |
| 3,618,917 A | 11/1971 | Fredrikson |
| 3,650,730 A | 3/1972 | Derham et al. |
| 3,689,048 A | 9/1972 | Foulard et al. |
| 3,715,112 A | 2/1973 | Carbonnel |
| 3,743,263 A | 7/1973 | Szekely |
| 3,743,500 A | 7/1973 | Foulard et al. |
| 3,753,690 A | 8/1973 | Emley et al. |
| 3,759,635 A | 9/1973 | Carter et al. |
| 3,767,382 A | 10/1973 | Bruno et al. |
| 3,776,660 A | 12/1973 | Anderson et al. |
| 3,785,632 A | 1/1974 | Kraemer et al. |
| 3,814,400 A | 6/1974 | Seki |
| 3,824,042 A | 7/1974 | Barnes et al. |
| 3,836,280 A | 9/1974 | Koch |
| 3,839,019 A | 10/1974 | Bruno et al. |
| 3,871,872 A | 3/1975 | Downing et al. |
| 3,873,305 A | 3/1975 | Claxton et al. |
| 3,886,992 A | 6/1975 | Maas et al. |
| 3,915,694 A | 10/1975 | Ando |
| 3,954,134 A | 5/1976 | Maas et al. |
| 3,961,778 A | 6/1976 | Carbonnel et al. |
| 3,972,709 A | 8/1976 | Chin et al. |
| 3,984,234 A | 10/1976 | Claxton et al. |
| 3,985,000 A | 10/1976 | Hartz |
| 3,997,336 A | 12/1976 | van Linden et al. |
| 4,003,560 A | 1/1977 | Carbonnel |
| 4,018,598 A | 4/1977 | Markus |
| 4,052,199 A | 10/1977 | Mangalick |
| 4,068,965 A | 1/1978 | Lichti |
| 4,091,970 A | 5/1978 | Kimiyama et al. |
| 4,126,360 A | 11/1978 | Miller et al. |
| 4,128,415 A | 12/1978 | van Linden et al. |
| 4,169,584 A | 10/1979 | Mangalick |
| 4,286,985 A | 9/1981 | van Linden et al. |
| 4,322,245 A | 3/1982 | Claxton |
| 4,351,514 A | 9/1982 | Koch |
| 4,360,314 A | 11/1982 | Pennell |
| 4,370,096 A | 1/1983 | Church |
| 4,372,541 A | 2/1983 | Bocourt et al. |
| 4,392,888 A | 7/1983 | Eckert et al. |
| 4,410,299 A | 10/1983 | Shimoyama |
| 4,456,424 A | 6/1984 | Araoka |
| 4,470,846 A * | 9/1984 | Dube .................. 266/235 |
| 4,504,392 A | 3/1985 | Groteke |
| 4,537,624 A | 8/1985 | Tenhover et al. |
| 4,537,625 A | 8/1985 | Tenhover et al. |
| 4,556,419 A | 12/1985 | Otsuka et al. |
| 4,557,766 A | 12/1985 | Tenhover et al. |
| 4,586,845 A | 5/1986 | Morris |
| 4,598,899 A | 7/1986 | Cooper |
| 4,600,222 A | 7/1986 | Appling |
| 4,609,442 A | 9/1986 | Tenhover et al. |
| 4,611,790 A | 9/1986 | Otsuka et al. |
| 4,634,105 A | 1/1987 | Withers et al. |
| 4,640,666 A | 2/1987 | Sodergard |
| 4,696,703 A | 9/1987 | Henderson et al. |
| 4,701,226 A | 10/1987 | Henderson et al. |
| 4,714,371 A | 12/1987 | Cuse |
| 4,717,540 A | 1/1988 | McRae et al. |
| 4,743,428 A | 5/1988 | McRae et al. |
| 4,770,701 A | 9/1988 | Henderson et al. |
| 4,786,230 A | 11/1988 | Thut |
| 4,802,656 A | 2/1989 | Hudault et al. |
| 4,804,168 A | 2/1989 | Otsuka et al. |
| 4,810,314 A | 3/1989 | Henderson et al. |
| 4,834,573 A | 5/1989 | Asano et al. |
| 4,842,227 A | 6/1989 | Harrington et al. |
| 4,844,425 A | 7/1989 | Piras et al. |
| 4,867,638 A | 9/1989 | Handtmann et al. |
| 4,973,433 A | 11/1990 | Gilbert et al. |
| 4,989,736 A | 2/1991 | Andersson et al. |
| 5,028,211 A * | 7/1991 | Mordue et al. ......... 416/204 R |
| 5,088,893 A | 2/1992 | Gilbert et al. |
| 5,092,821 A | 3/1992 | Gilbert et al. |
| 5,098,134 A | 3/1992 | Monckton |
| 5,131,632 A | 7/1992 | Olson |
| 5,143,357 A | 9/1992 | Gilbert et al. |
| 5,145,322 A | 9/1992 | Senior, Jr. et al. |
| 5,162,858 A | 11/1992 | Shoji et al. |
| 5,165,858 A | 11/1992 | Gilbert et al. |
| 5,203,681 A | 4/1993 | Cooper |
| 5,209,641 A | 5/1993 | Hoglund et al. |
| 5,268,020 A | 12/1993 | Claxton |
| 5,318,360 A | 6/1994 | Langer et al. |
| 5,388,633 A | 2/1995 | Mercer, II et al. |
| 5,399,074 A | 3/1995 | Nose et al. |
| 5,407,294 A | 4/1995 | Giannini |
| 5,431,551 A | 7/1995 | Aquino et al. |
| 5,468,280 A | 11/1995 | Areaux |
| 5,484,265 A | 1/1996 | Horvath et al. |
| 5,495,746 A | 3/1996 | Sigworth |
| 5,509,791 A | 4/1996 | Turner |
| 5,558,501 A | 9/1996 | Wang et al. |
| 5,558,505 A | 9/1996 | Mordue et al. |
| 5,586,863 A | 12/1996 | Gilbert et al. |
| 5,597,289 A | 1/1997 | Thut |
| 5,622,481 A | 4/1997 | Thut |
| 5,634,770 A | 6/1997 | Gilbert et al. |
| 5,655,849 A | 8/1997 | McEwen et al. |
| 5,662,725 A | 9/1997 | Cooper |
| 5,685,701 A | 11/1997 | Chandler et al. |
| 5,716,195 A | 2/1998 | Thut |
| 5,735,668 A | 4/1998 | Klien |
| 5,735,935 A | 4/1998 | Areaux |
| 5,741,422 A | 4/1998 | Eichenmiller et al. |
| 5,772,324 A | 6/1998 | Falk |
| 5,785,494 A | 7/1998 | Vild et al. |
| 5,842,832 A | 12/1998 | Thut |
| 5,944,496 A | 8/1999 | Cooper |
| 5,947,705 A | 9/1999 | Mordue et al. |
| 5,993,726 A | 11/1999 | Huang |
| 5,993,728 A | 11/1999 | Vild |
| 6,036,745 A | 3/2000 | Gilbert et al. |
| 6,074,455 A | 6/2000 | van Linden et al. |

* cited by examiner

SCRAP MELTER AND IMPELLER

FIELD OF THE INVENTION

The present invention relates to a device, called a scrap melter, for submerging scrap metal in a molten metal bath. The device preferably includes a drive source, an impeller and a drive shaft. The device preferably draws molten metal downward in order to submerge scrap placed on the surface of the bath.

BACKGROUND OF THE INVENTION

Figure 1:
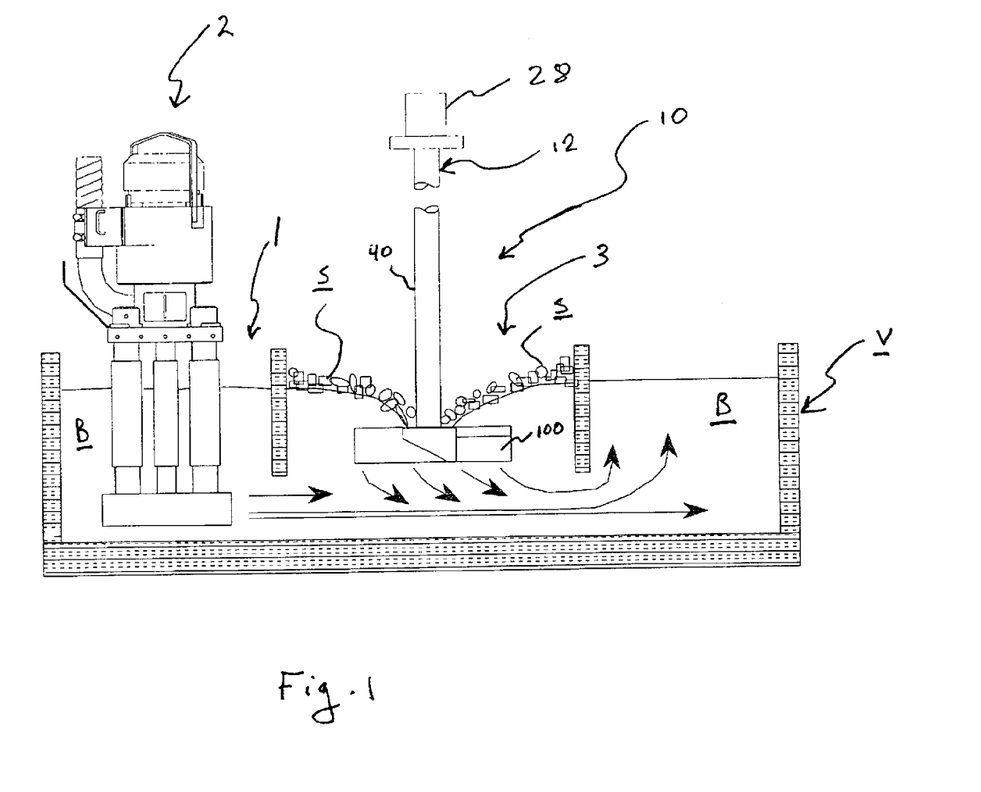
FIG. 1 is a side view of a scrap melter system according to the invention comprising a scrap melter, a vessel and an impeller according to the invention.
Figure 2:
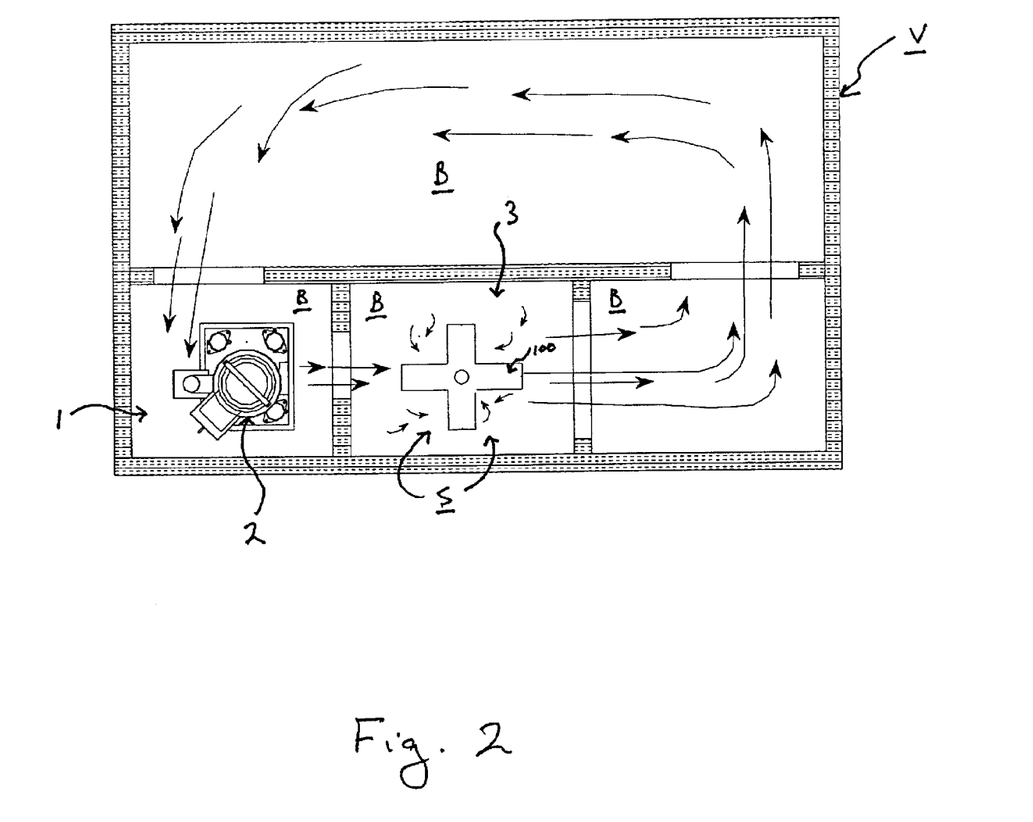
FIG. 2 is a top view of the system shown in FIG. 1.

Scrap melter systems, such as the one shown schematically in FIGS. 1 and 2, generally use two devices, a circulation pump and a scrap melter. As shown in FIG. 1 the vessel V containing molten metal bath B is preferably divided into two compartments. Compartment 1 (called a pump well) houses circulation pump 2. Compartment 3 (called a charge well) houses a scrap melter 10. The circulating molten metal moves between compartment 1 and compartment 3 and is preferably circulated throughout vessel V. Scrap S is introduced into compartment 3 and is submerged by the downward draw created by the impeller of scrap melter 10, which pulls the scrap downward into the molten metal bath. The molten metal bath is preferably maintained, at least partially, in a remelting furnace having a heating chamber interconnected to a melting chamber. Bath B is maintained at a temperature above the melting point of the scrap metal in order to melt the scrap metal.

A conventional scrap melter includes an impeller affixed to a drive shaft, and a drive source for rotating the shaft and the impeller. As stated above, the impeller draws molten metal and the scrap metal downward into the molten metal bath in order to melt the scrap. The circulation pump is preferably positioned in the pump well and circulates the molten metal between the chambers in order to maintain a relatively constant temperature within bath B. Such a system, including a circulation pump and a scrap melter, is disclosed in U.S. Pat. No. 4,598,899, issued Jul. 8, 1986 to Cooper, the disclosure of which that is not inconsistent with this disclosure is incorporated herein by reference. As defined herein, the terms auger, rotor and impeller refer to the same general structure, i.e., a device used in a scrap melter for displacing molten metal.

Scrap melter impellers generally move molten metal radially outward away from the impeller to create a downward draw above the impeller. However, such impellers can create turbulence or flow that may partially move into the path of the fluid entering the impeller from above, in which case some scrap may not be efficiently drawn into bath B where it can be melted and mixed, thus decreasing the fluid flow to the impeller and decreasing the efficiency of the scrap melting operation. In addition, the radial turbulence may cause some fluid that has been expelled from the impeller to be immediately recirculated through the impeller, thus decreasing the flow of virgin fluid through the impeller. That further decreases efficiency because it reduces the draw of molten metal from above the impeller. As a result, in order to maintain a desired volume of fluid flow through the impeller, the speed of the impeller may be increased to overcome these effects. Increasing the speed of the impeller, however, may cause excess vibration leading to part failure, downtime and maintenance expenses.

Scrap melters have been developed to restrict radial flow from the impeller to limit turbulence and produce more efficient flow. One such assembly, disclosed in U.S. Pat. No. 4,930,986, issued Jun. 5, 1990 to Cooper, the disclosure of which that is not inconsistent with this disclosure is incorporated herein by reference, includes an impeller positioned inside a drum, both of which rotate as a single unit. One disadvantage to this assembly is that pieces of scrap or dross can jam in it, which decreases its efficiency. Other prior art devices are disclosed in U.S. Patent Nos. 4,286,985, 3,984, 234, 4,128,415 and 4,322,245.

SUMMARY OF THE INVENTION

The preferred embodiment of the present invention is a scrap melter utilizing an open impeller to reduce jamming or clogging. Thus, the invention can function efficiently in virtually any scrap melting environment, handling particles of virtually any size that are likely to be encountered in any such environment. An impeller according to the invention functions by displacing molten metal to create a downward draw. It provides the benefit of reducing the problems associated with faster operating speeds (i.e., the possible creation of a vortex and turbulence, and/or part failure, greater downtime and higher maintenance costs). The way in which it achieves these results is by (a) displacing more molten metal while operating at the same speed as conventional impellers, and/or (b) moving at least some of the molten metal in a downward or partially downward direction.

An impeller according to the invention displaces more molten metal by the use of (1) a larger area on the blade surfaces that push against the molten metal as the impeller rotates, and/or (2) surfaces that push against the metal at angles that displace a relatively large amount of molten metal. One impeller according to the invention preferably moves molten metal at least partially in the downward direction, while another moves molten metal only in an outward direction.

In one preferred embodiment the impeller is preferably a four-bladed cross wherein each blade preferably includes an angled surface that directs molten metal at least partially in the downward direction. The impeller creates a draw that draws molten metal and any solid scrap metal contained therein downward into the molten metal bath. It also preferably provides at least some radial or partially radial flow, and may include a surface or structure specifically designed to generate radial or partially radial flow, to assist in circulating molten metal within the bath.

In another preferred embodiment, the impeller is preferably a four-bladed cross wherein each blade preferably includes a vertical surface that directs molten metal radially outward away from the impeller. The impeller creates a draw that draws molten metal and any solid scrap metal contained therein downward into the molten metal bath. It also assists in circulating molten metal within the bath.

A scrap melter according to the invention can be operated at lower speeds than conventional melters but still displace the same amount of molten metal per impeller revolution. Alternatively, it can be operated at the same speeds as, and displace more molten than conventional scrap melters. A benefit of the lower speed is that the scrap melter of the invention vibrates less and requires less maintenance and fewer replacement parts.

A preferred melter according to the invention includes a drive source, a drive shaft having a first end and a second end and an impeller. The first end of the drive shaft is connected to the drive source. An impeller according to the invention is connected to the second end of the drive shaft. The drive source is preferably a pneumatic or electric motor, but can be any device(s) capable of rotating the impeller.

A scrap melter according to the invention may be used in a scrap melter system comprising a scrap melter, a vessel containing a molten metal bath and a circulation pump. Conventional pumps for pumping molten metal that may be used as circulation pumps are generally disclosed in U.S. Pat. No. 2,948,524 to Sweeney et al., U.S. Pat. No. 5,203,681 to Cooper entitled "Submersible Molten Metal Pump," pending U.S. application Ser. No. 08/59,780, filed Dec. 13, 1996, entitled Molten Metal Pump With a Flexible Coupling and Cement-Free Metal-Transfer Conduit Connection, U.S. Pat. No. to Cooper entitled Impeller Bearing System for Molten Metal Pumps, U.S. application Ser. No. 09/152,168, filed Sep. 11, 1998, entitled Improved Gas Dispersion Device, U.S. Pat. No. 5,678,807 to Cooper and U.S Pat. No. 5,662,725 to Cooper, the disclosures of which are incorporated herein by reference.

BRIEF DESCRIPTION OF THE DRAWINGS

Embodiments of the present invention will now be described with reference to the drawings, wherein like designations denote like elements, and.

DESCRIPTION OF PREFERRED EMBODIMENTS

Referring now to the figures, where the purpose is for describing a preferred embodiment of the invention and not for limiting same, FIG. 1 shows a scrap melter 10 submerged in a molten metal bath B. All of the components of scrap melter 10 exposed to molten metal bath B are preferably formed from oxidation-resistant graphite or other material suitable for use in molten metal.

A drive source 28 is connected to impeller 100 by any structure suitable to transfer driving force from source 28 to impeller 100. Drive source 28 is preferably an electric, pneumatic or hydraulic motor although, as used herein, the term drive source refers to any device or devices capable of rotating impeller 100.

A drive shaft 12 is preferably comprised of a motor drive shaft (not shown) connected to an impeller drive shaft 40. The motor drive shaft has a first end and a second end, the first end being connected to motor 28 by any suitable means and which is effectively the first end of drive shaft 12 in the preferred embodiment. An impeller shaft 40 has a first end 42 (shown in FIG. 4) and a second end 44. The preferred structure for connecting the motor drive shaft to impeller drive shaft 40 is a coupling (not shown). The coupling preferably has a first coupling member and a second coupling member. The first end 42 of impeller shaft 40 is connected to the second end of the motor shaft, preferably by the coupling, wherein the first end 42 of impeller shaft 40 is connected to the second coupling member and the second end of the motor drive shaft is connected to the first coupling member. The motor drive shaft drives the coupling, which, in turn, drives impeller drive shaft 40. Preferably, the coupling and first end 42 of the impeller shaft 40 are connected without the use of connecting threads.

Figure 3:
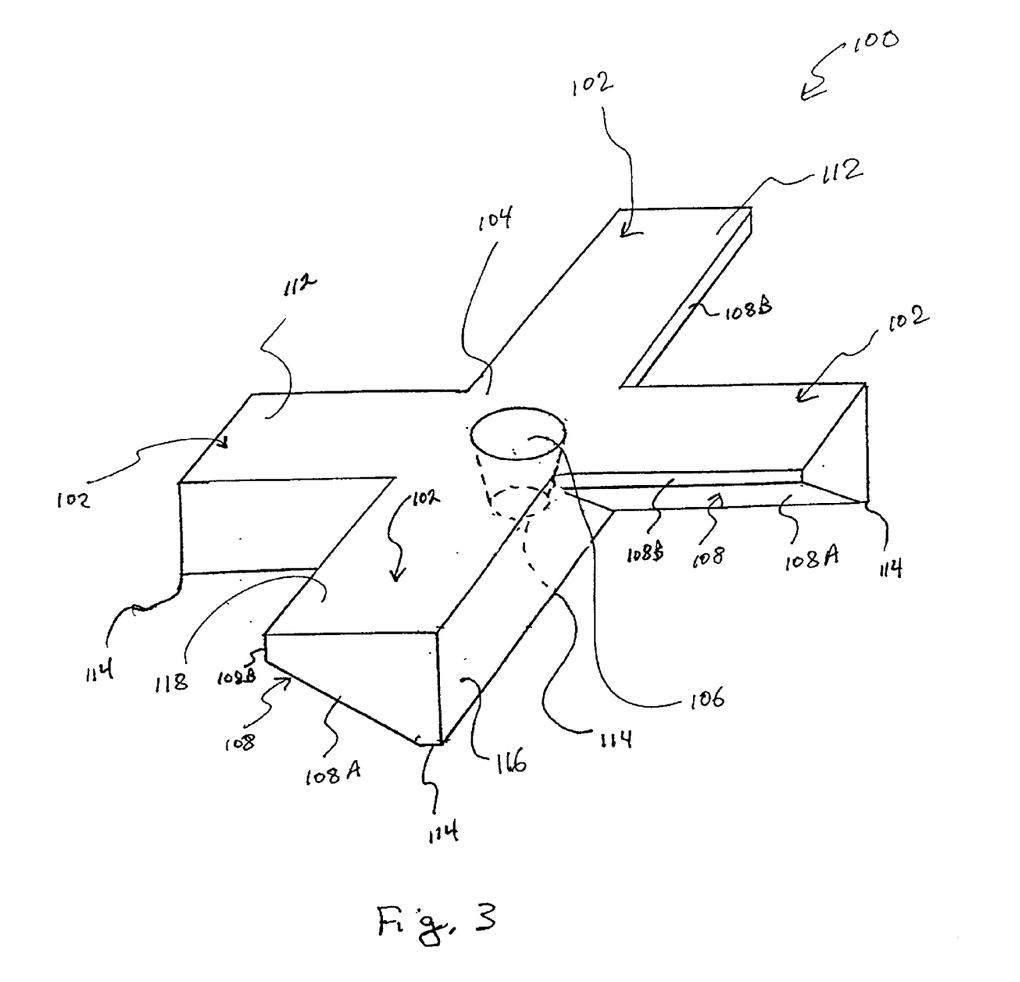
FIG. 3 is a perspective view of a preferred impeller according to the invention.

Impeller 100 is an open impeller. As used herein the term open refers to an impeller that allows dross and scrap to pass through it, as opposed to impellers such as the one shown in U.S. Pat. No. 4,930,986, which does not allow for the passage of much dross and scrap, because the particle size is often too great to pass through the impeller. Preferred impeller 100 is best seen in FIG. 3. Impeller 100 provides a greater surface area to move molten metal than conventional impellers. Impeller 100 is preferably imperforate, has two or more blades, is preferably formed of solid graphite, is attached to and driven by shaft 12, by being attached to shaft 40 in the preferred embodiment, and is preferably positioned centrally about the axis of shaft 40. Impeller 100 may, however, have a perforate structure (such as a bird-cage impeller, the structure of which is known to those skilled in the art) or partially perforate structure, and be formed of any material suitable for use in a molten metal environment.

Figure 5:
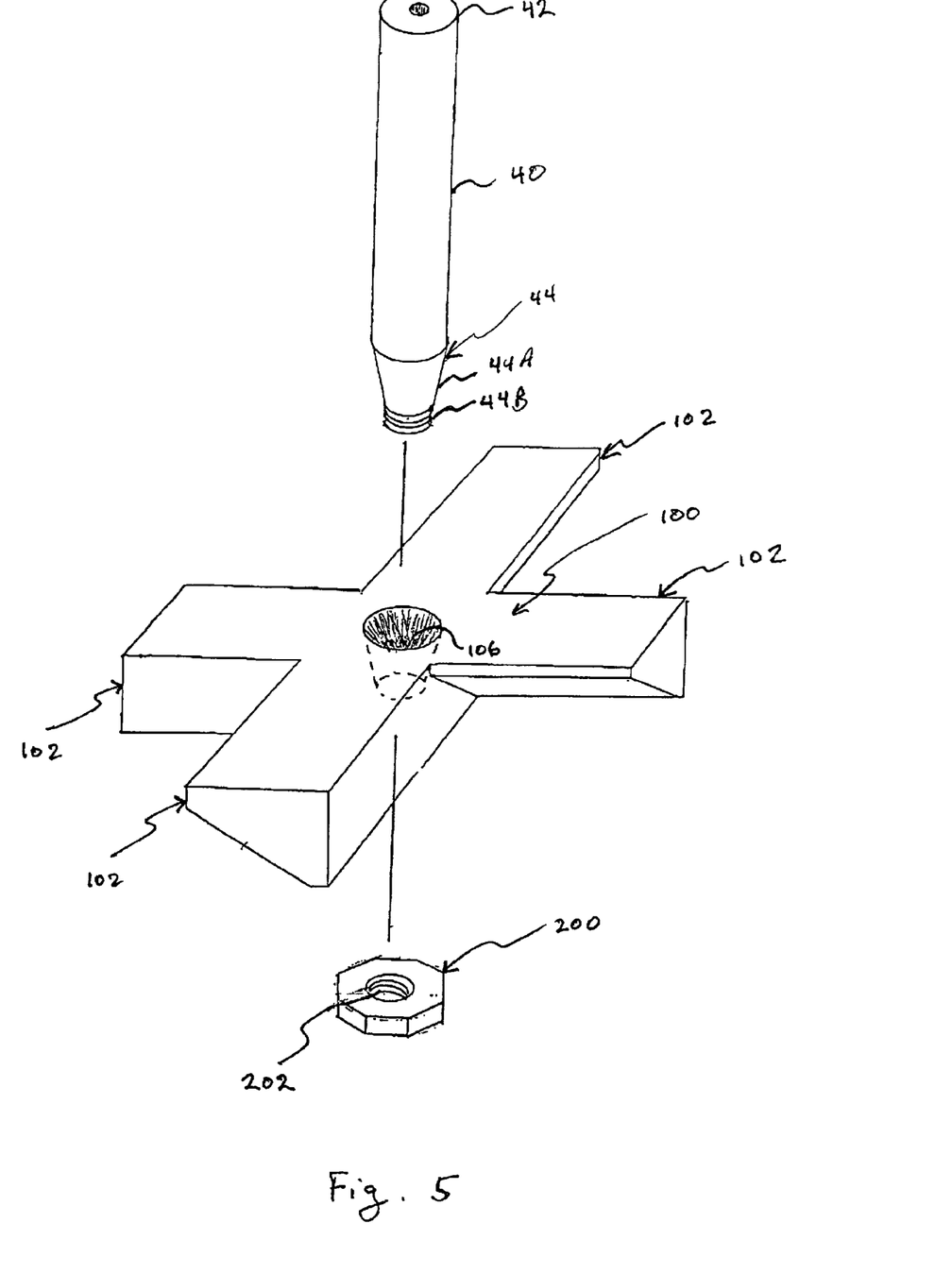
FIG. 5 shows an exploded, perspective view of an assembly according to the invention, including a drive shaft, the impeller of FIG. 3 and a nut.

Impeller 100 most preferably has four blades 102 and is shaped like a cross when viewed from the top. Impeller 100 includes a central section, or hub, 104 that is the area defined by the intersection between blades 102, when impeller 100 has three or more blades. In the preferred embodiment, hub 104 is an approximately 8" square. A connective portion 106 is preferably a nonthreaded, tapered bore extending through hub 104, but can be any structure capable of connecting impeller 100 to drive shaft 12. The preferred embodiment of impeller 100 also has a top surface 112, a bottom surface 114, and a trailing face 116. The diameter of connective portion 106 is approximately 5" at upper surface 112 and tapers to approximately 4" at lower surface 114 to form a tapered bore as shown in FIGS. 3 and 5.

The height of surface 116, measured vertically, is preferably between 6 and 7 inches. Each blade 102 preferably extends approximately 10" outward from hub 104, the overall preferred length and width of impeller 100, including hub 104, therefore being approximately 28". A recess (not shown) may be formed from top surface 112 to trailing surface 116.

Preferably, each blade 102 has the same configuration so only one blade 102 shall be described. In the preferred embodiment, blade 102 has a leading face 108. Face 108 is on the leading side of blade 102 as it rotates (as shown impeller 100 is designed to rotate in a clockwise direction). Face 108 includes an angled portion 108A and a vertical lip 108B. Portion 108A directs molten metal at least partly in the downward direction, toward the bottom of vessel V, as shown in FIG. 1. Surface 108A may be substantially planar or curved, or multi-faceted, such that, as impeller 100 turns, surface 108A directs molten metal partially in the downward direction. Any surface or structure that functions to direct molten metal downward or partially downward can be used, but it is preferred that surface 108A is formed at a 30°–60° , and most preferably a 45° planar angle. Alternatively, leading face 108 may itself be, or include a surface that is, (1) vertical, (2) substantially vertical, or (3) angled to direct molten metal in a partially upward direction, because the radial displacement of molten metal alone will create a downward draw in the space above impeller 100.

Figure 4:
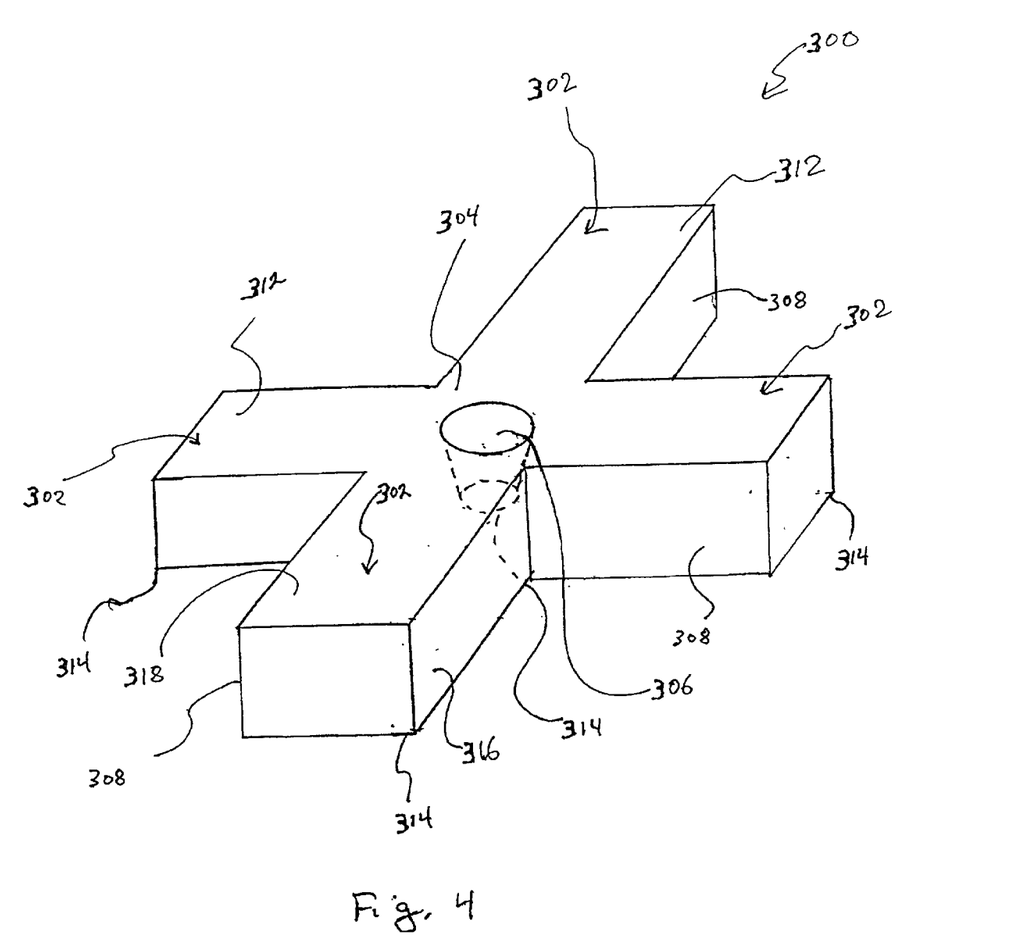
FIG. 4 is perspective view of an alternate preferred impeller according to the invention.

Impeller 300, shown in FIG. 4, is also an open impeller. Preferred impeller 300 is best seen in FIG. 4. Impeller 300 also provides a greater surface area to move molten metal than conventional impellers. Impeller 300 is preferably imperforate, has two or more blades, is preferably formed of solid graphite, is attached to and driven by shaft 12, by being attached to shaft 40 in the preferred embodiment, and is preferably positioned centrally about the axis of shaft 40. Impeller 100 may, however, have a perforate structure (such as a bird-cage impeller, the structure of which is known to those skilled in the art) or partially perforate structure, and be formed of any material suitable for use in a molten metal environment.

Impeller 300 most preferably has four blades 302. Impeller 300 includes a central section, or hub, 304 that is the area defined by the intersection between blades 302, when impeller 300 has three or more blades. In the preferred embodiment, hub 304 is an approximately 8" square. A connective portion 306 is preferably a nonthreaded, tapered bore extending through hub 304, but can be any structure capable of connecting impeller 300 to drive shaft 12. The preferred embodiment of impeller 300 also has a top surface 312, a bottom surface 314, and a trailing face 316. The diameter of connective portion 306 is approximately 5" at upper surface 312 and tapers to approximately 4" at lower surface 314 to form a tapered bore as shown in FIG. 4.

The height of surfaces 308, 316, measured vertically, is preferably between 6 and 7 inches. Each blade 302 preferably extends approximately 10" outward from hub 304, the overall preferred length and width of impeller 300, including hub 304, therefore being approximately 28". A recess (not shown) may be formed from top surface 312 to trailing surface 316.

Preferably, each blade 302 has the same configuration so only one blade 302 shall be described. In the preferred embodiment, blade 102 has a leading face 308. Face 308 is on the leading side of blade 302 as it rotates (as shown impeller 300 is designed to rotate in a clockwise direction). Face 308 is vertical (as used herein, the term vertical refers to any vertical or substantially vertical surface) and directs molten metal outward away from impeller 300. Face 308 may be substantially planar or curved, or multi-faceted, such that, as impeller 300 turns, face 308 directs molten metal outward. Any surface or structure that functions to direct molten metal outward can be used, but it is preferred that surface 308 is vertical and extends the full height of blade 308 so that blade 308 has a square cross section. Alternatively, face 308 may itself be, or include a surface that is angled to direct molten metal in a partially upward direction, because the radial displacement of molten metal alone will create a downward draw in the space above impeller 300.

Figure 6:
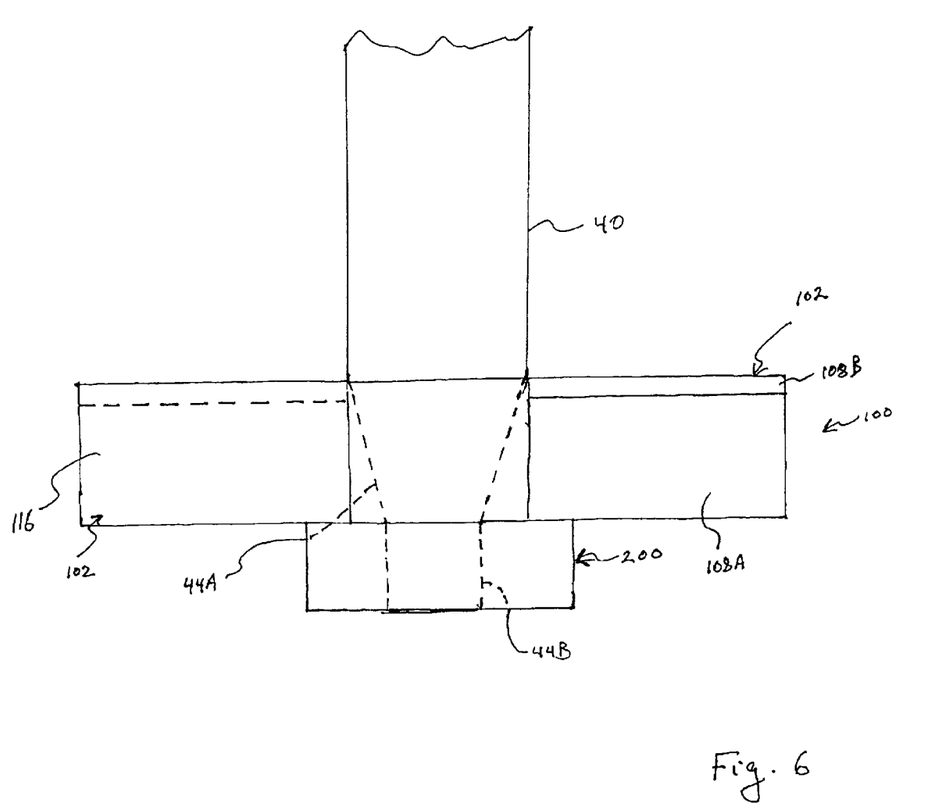
FIG. 6 is a partial side view of the assembly shown in FIG. 5, showing the connected components.

As shown in FIGS. 5 and 6, second end 44 of impeller drive shaft 40 preferably has a tapered section 44A that is received in the tapered bore of the preferred embodiment of connecting portion 106. End 44 also preferably has a threaded section 44B that extends below bottom surface 114 of impeller 100 when section 44A is received in connecting portion 106. In this preferred embodiment, a nut 200, that has a threaded opening 202, is screwed onto section 44B to retain impeller 100 on end 44 of rotor drive shaft 40. Nut 200 and section 44B preferably have 4"–4½" U.N.C. threads. Nut 200 is preferably a hex head nut having an overall diameter of approximately 7".

The purpose of tapered bore 106 is easy removal of end 44 of shaft 40 from connective portion 106. Some prior art devices utilize either a threaded bore and/or a right cylindrical bore, i.e., a bore having the same diameter at the top and bottom to connect the drive shaft to the impeller. The problem with such structures is that during operation of the scrap melter molten metal seeps between the end of the shaft and the bore in the impeller. This leads to difficulty in removing the shaft from the bore, and often the shaft must be chiseled out. The nonthreaded, tapered bore 106 of the invention alleviates this problem. Although only the preferred attachment of impeller 100 is shown, impeller 300 would preferably be attached to shaft 12 in the same manner as described for impeller 100.

Preferred embodiments having now been described, variations that do not depart from the spirit of the invention will occur to others. The invention is thus not limited to the preferred embodiment but is instead set forth in the following claims and legal equivalents thereof, which are contemplated to cover any such variations. Unless specifically stated in the claims, any of the claimed inventions may include structures or devices other than those specifically set forth in the claims.

What is claimed is:

1. A drive shaft used in a device for displacing molten metal, the drive shaft comprising:

(a) a first end; and (b) a second end, the second end configured to connect to an impeller and having a tapered portion and a threaded portion juxtaposed the tapered portion whereby the threaded portion is positioned beneath the impeller when the drive shaft is connected to the impeller.

2. A device for generating a downward stream of molten metal, the device comprising:

a drive source;

a drive shaft having a first end connected to the drive source and a second end;

an open impeller having a plurality of outwardly extending blades and a connective portion formed therein for attaching the impeller to the second end of the drive shaft, wherein at least one of the plurality of outwardly extending blades includes a portion that directs molten metal at least partially downward, wherein the connective portion formed in the impeller comprises a tapered, non-threaded bore extending through said impeller; and a nut wherein the second end of the drive shaft includes a threaded portion positioned through the non-threaded bore of the open impeller, the nut being threaded onto the threaded portion for removably securing the open impeller to said second end.

3. The device of claim 2 wherein the portion that directs molten metal at least partially downward is an angled surface.

4. The device of claim 2 wherein each of the plurality of outwardly extending blades includes angled surfaces for directing molten metal at least partially downward.

5. The device of claim 2 wherein the impeller comprises four outwardly extending blades formed substantially in a cross shape, wherein each of the outwardly extending blades includes an angled surface for directing molten metal at least partially in a downward direction.

6. The device of claim 5 wherein the angled surfaces are formed at a 45° angle with respect to an axis of impeller rotation.

7. The device of claim 2 wherein the impeller has an overall length of at least 28".

8. The device of claim 5 wherein, in addition to the angled surface, each of the four outwardly extending blades further includes a substantially vertical surface for directing molten metal outward.

9. A molten metal mixing device, the device comprising:

a drive source;

a drive shaft having a first end connected to the drive source and a second end;

an impeller for mixing molten metal, the impeller comprising two or more blades and a bore for receiving the second end of the drive shaft; and a fastener to secure the second end to the impeller, the fastener connected to the second end of the drive shaft and positioned beneath the impeller, wherein the fastener comprises a threaded fastener and wherein the second end of the drive shaft includes threads for receiving said threaded fastener.

10. The mixing device of claim 9 wherein the threaded fastener comprises a nut.

11. The drive shaft of claim 6 wherein the shaft is comprised of graphite.

12. The drive shaft of claim 1 wherein the first end of the shaft is connected to a coupling.

13. The drive shaft of claim 1 wherein the threaded portion has 4"–4½" U.N.C. threads.

14. The drive shaft of claim 1 wherein the threaded portion is positioned entirely beneath the impeller when the drive shaft is connected to the impeller.

15. The drive shaft of claim 1 wherein said drive shaft is comprised of graphite.

16. The drive shaft of claim 1 wherein the threaded portion is configured to secure a nut.

17. The device of claim 2 wherein the drive shaft and impeller are each formed of graphite.

18. The device of claim 9 wherein the drive shaft and impeller are each formed of graphite.

* * * * *